(12) United States Patent
Vrzic et al.

(10) Patent No.: US 10,165,514 B2
(45) Date of Patent: Dec. 25, 2018

(54) SYSTEMS AND METHODS FOR USER EQUIPMENT POWER MANAGEMENT VIA THIRD PARTY ENTITY

(71) Applicants: Sophie Vrzic, Kanata (CA); Hang Zhang, Nepean (CA); Nimal Gamini Senarath, Ottawa (CA)

(72) Inventors: Sophie Vrzic, Kanata (CA); Hang Zhang, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 15/169,355

(22) Filed: May 31, 2016

(65) Prior Publication Data

US 2016/0353379 A1    Dec. 1, 2016

Related U.S. Application Data

(60) Provisional application No. 62/168,972, filed on Jun. 1, 2015.

(51) Int. Cl.
*H04W 52/02* (2009.01)
*H04W 4/00* (2018.01)
(Continued)

(52) U.S. Cl.
CPC ......... *H04W 52/0235* (2013.01); *H04W 4/08* (2013.01); *H04W 4/70* (2018.02);
(Continued)

(58) Field of Classification Search
CPC ... H04W 52/0235; H04W 4/08; H04W 4/005; H04W 52/00; H04W 52/0209;
(Continued)

(56) References Cited

U.S. PATENT DOCUMENTS

2007/0036096 A1    2/2007  Sinivaara
2010/0208660 A1*   8/2010  Ji ..................... H04W 52/0225
                                                         370/328
(Continued)

FOREIGN PATENT DOCUMENTS

CN    1771693 A     2/2007
CN    102156530 A   8/2011
(Continued)

OTHER PUBLICATIONS

Internaitonal Search Report and Written Opinion for PCT/CN2016/084402, dated Aug. 24, 2016.
(Continued)

*Primary Examiner* — Maharishi V Khirodhar
*Assistant Examiner* — Kenneth P Hunt

(57) ABSTRACT

A method for User Equipment (UE) power management in a wireless communication system is provided. A connection manager of the communication system receives a power management policy from a third party entity. The policy directs setting of a power management scheme according to status information of the UE. The third party entity is functionally separate from the UE and a network domain associated with the connection manager. Status information is received from the UE. A power management instruction is transmitted towards the UE to modify power management parameters stored in the UE.

17 Claims, 12 Drawing Sheets

(51) Int. Cl.
*H04W 4/08* (2009.01)
*H04W 4/70* (2018.01)
*H04W 76/28* (2018.01)

(52) U.S. Cl.
CPC ....... *H04W 52/0274* (2013.01); *H04W 76/28* (2018.02); *Y02D 70/1262* (2018.01); *Y02D 70/21* (2018.01); *Y02D 70/24* (2018.01)

(58) Field of Classification Search
CPC ......... H04W 52/0212; H04W 52/0225; H04W 52/0229; H04W 52/0251; Y02B 60/50; H04L 12/12; G06F 1/32–1/3231
USPC ........... 370/311; 713/300–340; 455/522, 574
See application file for complete search history.

(56) References Cited

U.S. PATENT DOCUMENTS

| | | | | |
|---|---|---|---|---|
| 2011/0275328 | A1* | 11/2011 | Kwon | G01R 31/3689 455/67.11 |
| 2011/0299412 | A1* | 12/2011 | Diab | H04L 12/12 370/252 |
| 2012/0210325 | A1* | 8/2012 | de Lind van Wijngaarden | H04W 52/0258 718/103 |
| 2012/0239218 | A1* | 9/2012 | Forbes, Jr. | G01D 4/004 700/295 |
| 2012/0271472 | A1* | 10/2012 | Brunner | G06F 1/3209 700/295 |
| 2013/0097444 | A1* | 4/2013 | Hoagland | G06F 1/3206 713/323 |
| 2015/0099506 | A1 | 4/2015 | Iwai et al. | |
| 2016/0007138 | A1* | 1/2016 | Palanisamy | H04W 4/70 455/41.2 |
| 2016/0073341 | A1 | 3/2016 | Chao et al. | |
| 2016/0105489 | A1* | 4/2016 | Llorca | H04L 67/10 709/226 |
| 2016/0291671 | A1* | 10/2016 | Rider | H02J 13/0006 |

FOREIGN PATENT DOCUMENTS

| | | |
|---|---|---|
| CN | 104105175 A | 3/2016 |
| TW | 201444218 A | 11/2014 |
| WO | 2014086168 A1 | 6/2014 |
| WO | 2015099700 A1 | 7/2015 |

OTHER PUBLICATIONS

English Abstract of CN102156530A.
Extended European Search Report dated May 15, 2018 for corresponding European Application No. 16802561.7 filed Jun. 1, 2016.

* cited by examiner

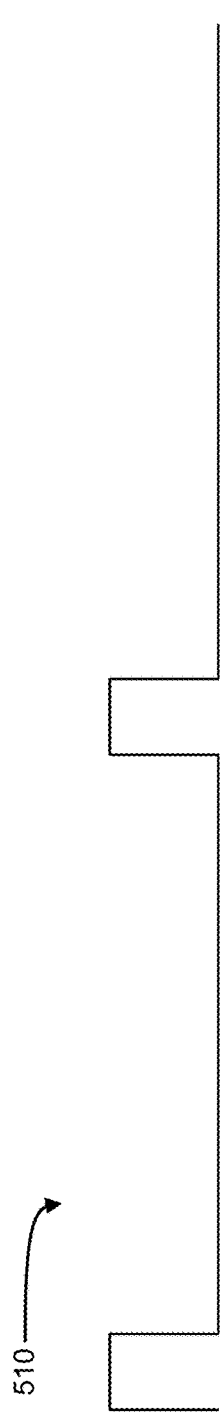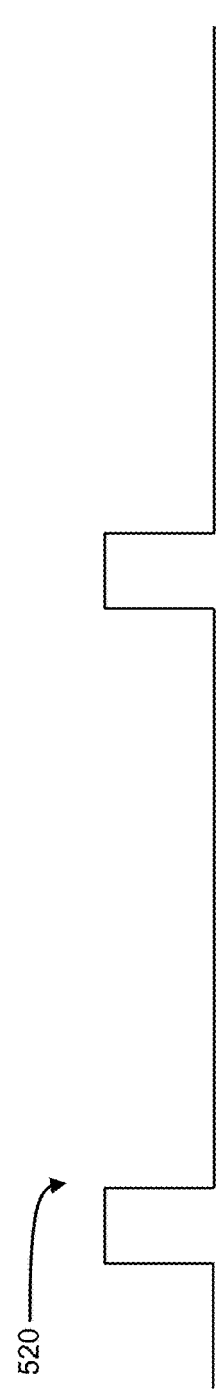

SYSTEMS AND METHODS FOR USER EQUIPMENT POWER MANAGEMENT VIA THIRD PARTY ENTITY

CROSS-REFERENCE TO RELATED APPLICATIONS

This application claims the benefit of U.S. Provisional Application Ser. No. 62/168,972, titled "Systems and Methods for MTC power Management" filed on Jun. 1, 2015, which is incorporated by reference herein in its entirety.

FIELD OF THE INVENTION

The present invention pertains to the field of communication networks, and in particular towards systems and methods for power management of user equipment via third party entity.

BACKGROUND

Conventional mobile networks, including those conforming to $4^{th}$ Generation (4G) standards, such as the Long Term Evolution (LTE) standards defined by the Third Generation Partnership Project (3GPP) are designed to provide wireless connections to mobile devices. Each mobile device connected to the network consumes resources whether it is active or not. To control inter-device interference, networks can impose power management on connected devices.

UE power management typically makes use of fixed or isolated power management schemes. For example, power management is often performed on a UE-by-UE basis. UE-by-UE power management schemes do not scale well. An individual network access point (AP) is expected to support an increasingly large number of connected devices as increasing numbers of machine-to-machine (M2M) devices, also referred to as Machine Type Communications (MTC) devices, are brought online.

Conventional mobile network designs treat all mobile devices as largely individual devices with unique needs and requirements. The network resources allocated to each device are typically over-provisioned so that the network can accommodate a variety of different scenarios for each device. These scenarios include highly variable mobility for each device and an unpredictable transmission schedule for both uplink and downlink transmissions. This model is based on supporting mobile UEs, each of which is independent of the other UEs and is unpredictably mobile. In contrast to conventional UEs, for which networks have typically been designed, entire classes of MTC devices may have very consistent mobility and transmission profiles. As the number of MTC devices connected to a single AP increases, the ability of a network to perform per-UE tailored power management will come under strain.

Accordingly, there is a need for a more flexible power management scheme that can adapt to changing network needs and increasing numbers of UEs and MTC devices connected to the network.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method for performing power management for a user equipment served by a communications network via third party entity.

In accordance with embodiments of the present invention, there is provided a method of User Equipment (UE) power management. UE power management may be achieved by receiving, at a connection manager, a power management policy from a third party entity. The power management policy may be for setting a power management scheme according to status information from the UE. The third party entity is functionally separate from the UE and a network domain is associated with the connection manager. Status information is received from the UE and a power management instruction is transmitted towards the UE to modify power management parameters stored in the UE.

In accordance with some embodiments of the present invention, there is provided a method of User Equipment (UE) power management wherein the third party entity may comprise an application server physically separate from the communications network, or a network slice operating on the communications network. The third party power management policy may comprise a threshold. Status information from the UE includes information related to a battery value, a data measurement, or data traffic information. Power management parameters stored in the UE may be a discontinuous reception (DRX) power saving cycle, an idle mode power saving scheme, or an inactivity timer. When the status information from the UE satisfies the third party power management policy threshold, a power management instruction may be transmitted. The third party power management policy may also include a lookup table, which in turn determines the power management parameters in accordance with this table. A power management instruction transmitted towards the UE may comprise the power management parameters, or a UE grouping message for assigning the UE to a UE group corresponding to the power management scheme.

In accordance with embodiments of the present invention, there is provided a method of User Equipment (UE) power management. UE power management may also be achieved by receiving a power management instruction with a radio node serving the UE. The UE may be assigned to a UE group corresponding to power management parameters. The UE group may be maintained in accordance with power management parameters. A third party entity may be notified of the UE group to which the UE was assigned, or of the power management instruction transmission. A status information request may be sent to the UE to prompt transmission of the status information from the UE. A measurement report relating to the UE may be received, and the power management policy updated according to the measurement report. The UE used within the UE power management method may be or include a machine type communication (MTC) device.

In accordance with embodiments of the present invention, there is provided a connection manager for controlling UE power management. The connection manager utilizes a network interface; a processor; and non-transient memory. The memory stores instructions that, when executed by the processor, cause the connection manager to define a set of power management parameters in accordance with a power management policy received from a third party functionally separate from a UE associated with the set of parameters and a network domain associated with the connection manager, and in accordance with status information received from the UE. The instructions also cause the connection manager to transmit a power management instruction over the network interface and towards the UE containing the defined set of power management parameters.

In accordance with embodiments of the present invention, there is provided a power management method for a UE communicatively coupled to a communications network. The power management may be accomplished once status information relating to the UE is received. A power management scheme may be set in accordance with the status information and a power management policy provided by a third party entity. The third party entity is separate from the UE and the communications network. A power management signal for implementing the power management scheme may be transmitted onto the UE.

BRIEF DESCRIPTION OF THE FIGURES

Further features and advantages of the present invention will become apparent from the following detailed description, taken in combination with the appended drawings, in which:

FIGS. 5A-5C illustrate various discontinuous reception power management schemes which may be set onto the UE, according to various embodiments of the present invention.

It will be noted that throughout the appended drawings, like features are identified by like reference numerals.

DETAILED DESCRIPTION

Figure 1:
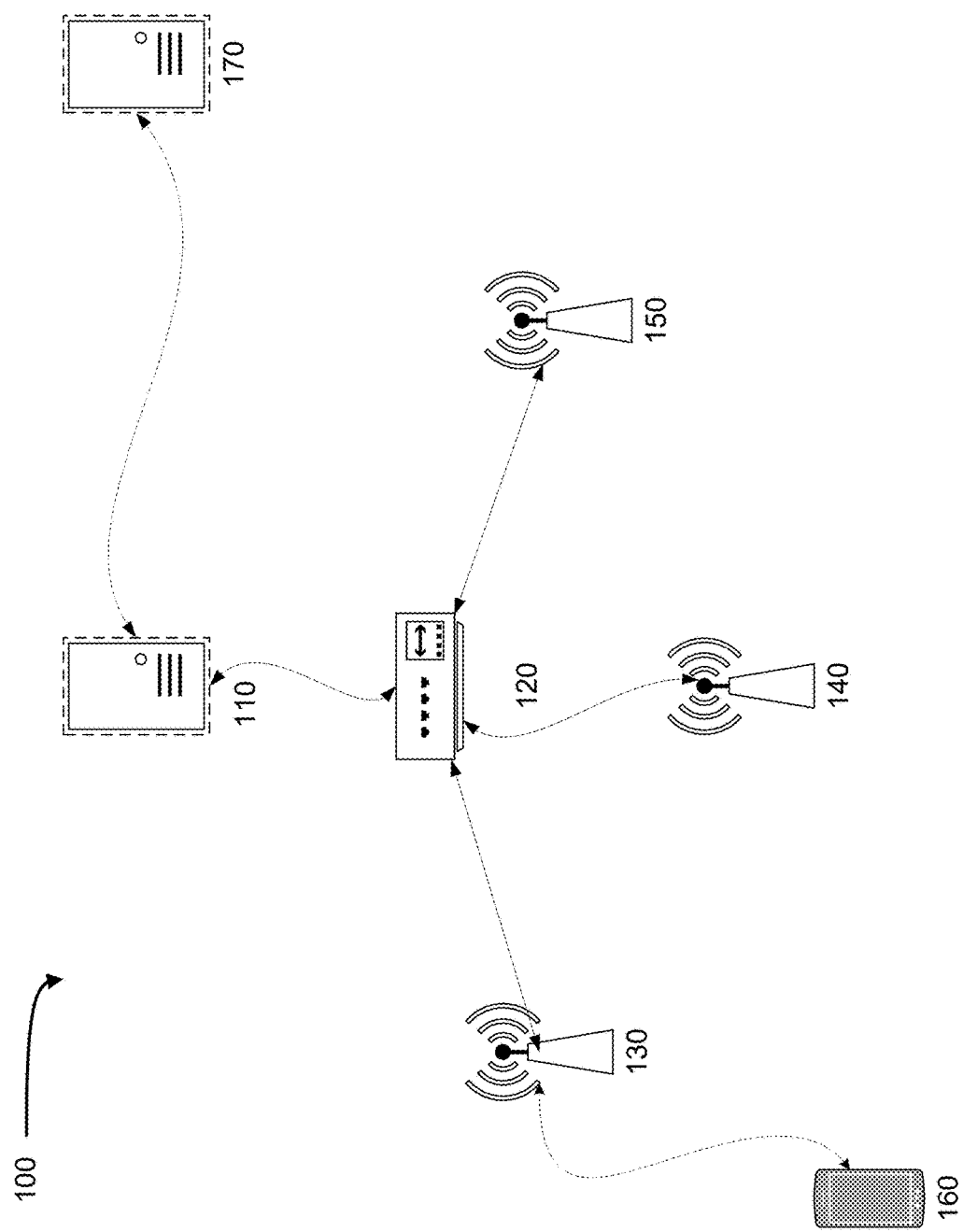
FIG. 1 illustrates a communications network serving a user equipment (UE), and having a third party entity communicatively coupled thereto, according to an embodiment of the present invention.

Mobile networks, such as those conforming to the 3GPP-based LTE standards, perform power management of UEs through a fixed or isolated power management scheme that is inflexible to changing network needs or increasing numbers of UEs served by the network. The network transmits its instructions carrying power management parameters to UEs individually. This becomes inefficient as the number of UEs served by the network increases.

The ability of a network operator to identify the individual power management needs of a given device, or even a given group of devices may be limited. As the variety of devices supported by mobile networks increases, they ability of the network operator to support the power management profiles of an increasing number of device types will diminish. Already in some LTE networks, all connected devices are provisioned with the assumption that they all have the capability of being highly mobile, and with the further assumption that there is no predictability to the scheduling of either upstream or downstream transmission. Although this decreases the power management burden imposed on the network, it is inefficient as the number of different device types increase. In environments where a network serves both conventional UEs, which can be very mobile and take advantage of mobile broadband communications, and devices designed to solely support MTC communications, which may have very confined mobility profiles but may also consist of a large number of different device types, it may not be possible for a network operator to be able to provide a sufficiently tailored set of power management parameters to each of the different classes of MTC devices.

Because a network operator does not always have the ability to control the profile of devices that connect to its mobile network, it is not practical to expect that a network operator will be able to provide specialized access profiles for each device that connects to the network. With the increase in the number of MTC Device deployments, m2m service providers and other third parties including device manufacturers have an increasingly better knowledge of the capabilities and characteristics of the devices deployed on carrier networks than the carrier does. Accordingly, it may be beneficial in some situations for a third party entity separate from the communications network and the UE (such as a network operator or third party application server) to manage the power parameters of the UE. This may improve network operating flexibility and help alleviate the power management burden otherwise borne by the communications network. Moreover, this may be particularly beneficial in the case of large numbers of UEs (such as large numbers of MTC devices) connected to the network. Offloading some power management functions to a third party allows for the processing resources of the communications network to instead focus on mobility management and connectivity service. Therefore, there is need for systems and methods which enable $3^{rd}$ party entities (such as $3^{rd}$ party programs operating on separate application servers) to perform the power management of UEs connected to a mobile network. In a large deployment of MTC devices, there may be a plurality of different device types and device profiles. Power management may be offloaded to an application server identified by the M2M customer (i.e. entity associated with the M2M devices), so that the responsibility of power management of the devices can be moved from the network to the customer (subject to limitations that may be agreed upon between the M2M customer and the network operator providing services to the M2M customer).

Referring to FIG. 1, there is shown a communications network 100 according to an embodiment of the present invention. The communications network 100 includes a plurality of network nodes, including a gateway node 110, a routing node 120, and radio nodes 130, 140, 150. A UE 160 is communicatively coupled to radio node 130, for example via wireless radio link. A third party entity 170 (such as an application server, for example), which is distinct from the communications network 100 and UE 160, is communicatively coupled to the gateway node 110. As will be described in greater detail below, the third party entity 170 is able to control power management for the UE 160 through a power management policy sent to the communications network 100. Although FIG. 1 only depicts a single UE 160 coupled to ratio node 130, in other embodiments (not shown), a plurality of UEs, or groups of UEs, may be coupled to any of radio nodes 130, 140, 150.

Figure 2:
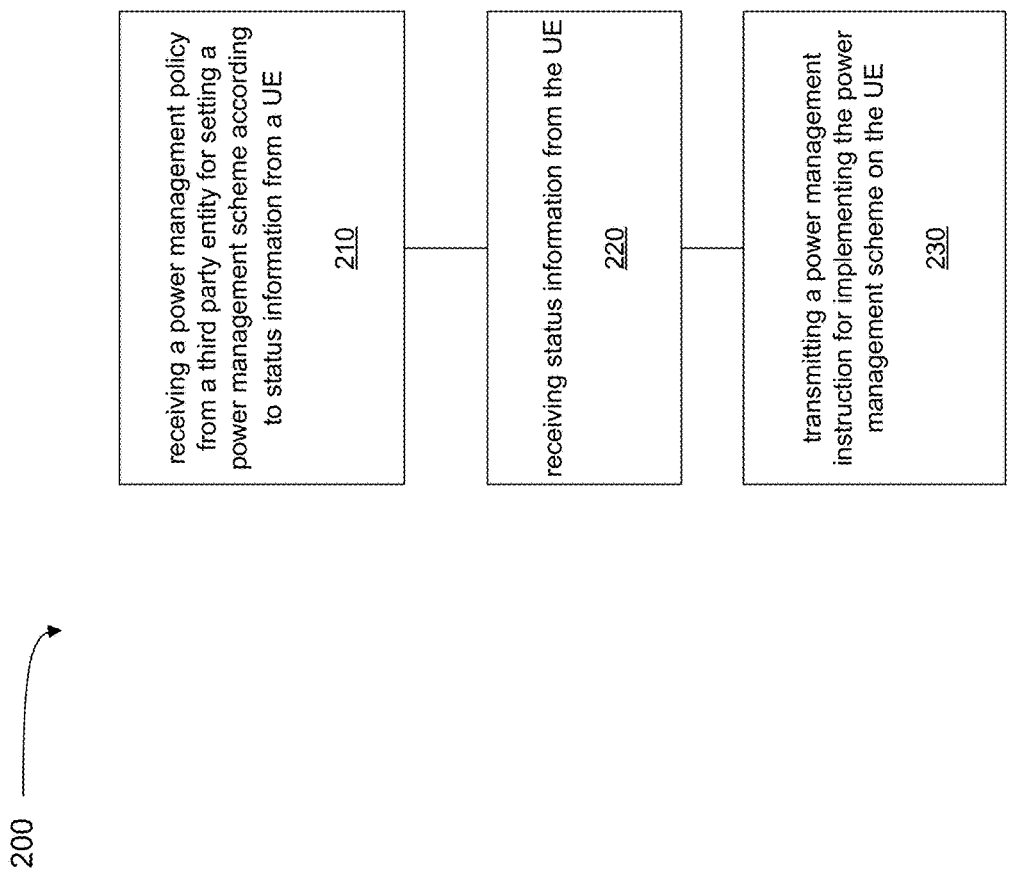
FIG. 2 is a flow chart illustrating a power management method for a UE communicatively coupled to a communications network, according to an embodiment of the present invention.

Referring to FIG. 2, there is shown a flow chart illustrating a power management method 200, according to an embodiment of the present invention. The method 200 can be carried out by one or more nodes such as Radio Edge Node 130 serving UE 160, or an intermediate node within the network such as routing node 120. It may also be carried out by an application server in the network. At step 210, a power management policy is received from a third party entity. The power management policy includes information about the power management scheme to be applied by a particular UE. In some embodiments the power management scheme is set in accordance with UE status information. As will be described in further detail below, the status information may comprise a power level of the UE, and the power management policy may comprise a threshold or lookup table used to determine an appropriate power management scheme based on the current status information of the UE. At step 220, status information associated with the UE is received. At step 230, a power management instruction, determined in accordance with the received policy and the received status information is transmitted. This instruction can be used to instruct the UE to vary operating parameters so as to cause it to carry out the power management scheme. As will be described later in further detail, the power management scheme may be determined in accordance with the status information of the UE and the power management policy received from the third party entity.

Regarding step 210, the power management policy may comprise a lookup table for determining power management parameters to be used by the UE based on the UE status information. For example, the lookup table may have various entries each having specific power management parameters corresponding to a specific value or range of the status information. Alternatively, the power management policy may comprise a threshold, from which the power management policy can be determined in accordance with the status information compared to the threshold. In other embodiments (not shown) the power management policy may comprise other suitable forms for determining a power management scheme, as understood by those skilled in the art.

The power management policy is received from a third party entity which is distinct from the communications network management. In this way, some of the power management functionality otherwise borne by the mobile network administration, can be offloaded onto a third party entity. For example, the third party employ an application server outside the core network of the mobile network, as depicted in FIG. 1. In some embodiments (not shown) the third party entity may comprise a function or group of functions which may reside in a Network Slice that is instantiated on the same infrastructure as the communications network, but through traffic isolation is functionally distinct.

Regarding step 220, the status information may be transmitted by the UE in response to receiving a status information request from a radio node. The status information request can prompt the UE to transmit status information. Alternatively, transmission of the status information may be initiated by the UE in response to an event trigger detected by the UE. Examples of such triggers can include detecting a specified change in the battery level, detecting a change in a charging state, and other such triggers as will be understood in the art. The status information may comprise any notification or data from the UE which may be used in the selection of an appropriate power saving scheme. The status information may be also used to indicate a current state, or predicted future state of the UE for determining a power management scheme. For example, the status information may comprise a battery value of the UE, a data measurement (such as from a sensor in the UE), or data traffic information. The status information may also identify a class of devices that the UE belongs to, a geographic location, a received signal strength indicator and other such information that can be used to determine the expected battery life of a device. Heavy data traffic currently experienced by the UE for example, may indicate a notable processing load which would reduce the battery level of the UE; this information may therefore be leveraged in determining an appropriate power management scheme in anticipation of this power loss. It should also be understood that the power management policy may set the power management parameters of all UEs in a specified area in accordance with the information obtained from a single UE. If a group of identical UEs are deployed at the same time, it may be safe in some circumstances to assume that all the UEs have approximately the same battery levels and other conditions.

Regarding step 230, the power management instruction may comprise a control signal sent to the UE indicative of at least one power management parameter. The control signal can explicitly indicate a set of power management parameters corresponding to the power management scheme selected in accordance with the received status information, or it could be an index used by the UE to perform a lookup of the parameters of a stored power management scheme. For example, the power management scheme may comprise an instruction to initiate an inactivity timer, during which the UE can enter a lower powered state (or even largely turn off), with an instruction to turn on at the expiry of the timer. In environments in which the mobile network is compliant with Third Generation Partnership Project ("3GPP") standards, the power management scheme may comprise a discontinuous reception ("DRX") cycle in order to conserve battery power of a UE, which can be managed on an individual or group basis by a serving radio node. The power management scheme may alternatively comprise a transition of the UE to an Evolved Packet System (EPS) Connection Management (collectively, ECM) IDLE mode where paging opportunities of each UE are managed individually by a mobility management entity (MME, not shown). Examples of DRX cycles will be shown further below.

In some embodiments, the power management instruction may be sent to an edge node or intervening node of the communications network, which in turn instructs the UE.

The message sent to an intervening node may cause the intervening node to transmit a different message to the UE. This allows for a central power management policy to be implemented using UE and location specific variations. As will be discussed in further detail below, the power management instruction may in these cases also comprise a UE grouping used for assigning the UE into a particular UE group. Each UE group can correspond to a power management scheme. In this way, the communications network (or radio node) may separate a plurality of UEs into different groups, and maintain each group according to a given power management scheme to more efficiently perform power management for large numbers of UEs (or MTC devices).

Figure 3:
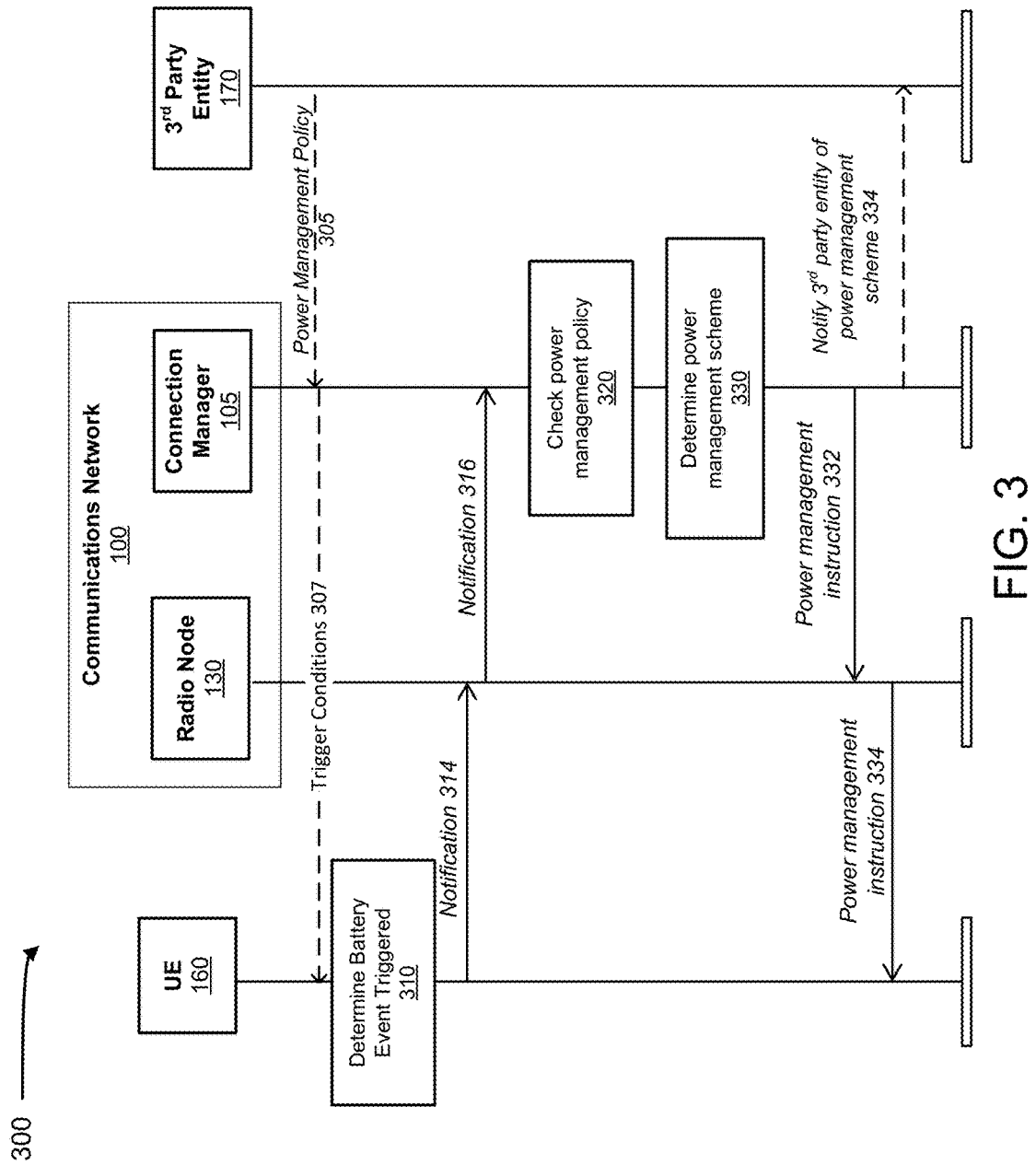
FIG. 3 is a call flow diagram illustrating a power management method for a UE communicatively coupled to a communications network, according to an embodiment of the present invention.

Referring to FIG. 3, there is shown a call flow diagram 300 illustrating a power management method performed within communications network 100 for UE 160 of FIG. 1, according to an embodiment of the present invention. In this embodiment, the communications network 100 comprises a radio node 130 which serves UE 160, and a connection manager 105 which is a functional entity deployed on the infrastructure of communications network 100 (for example, as a Virtual Network Function (VNF) within a network slice,). As shown, the third party entity 170 optionally sends (305) a power management policy to the connection manager 105. Receipt of the Power Management Policy causes Connection Manager 105 to configure itself to respond to notifications from the UE in accordance with the received policy. Alternatively, the connection manager 105 may be pre-configured with the power management policy from third party entity 170, precluding the need to transmit the policy. The trigger conditions associated with the power management policy may be forwarded (307) to UE 160 if UE 160 is to be configured to report after a condition changes. The UE 160 determines that the battery status has exceeded a threshold in step 310. In response to triggering the battery event 310, the UE transmits a notification (314) to Radio Node 130, which in turn forwards Notification (316) to the Connection Manager 105. For example, the battery event trigger 310 may comprise a pre-defined physical condition or state, such as a certain battery power level of UE 160, or an anticipated battery level drop. The conditions for triggering the battery event 310 may be set by any of the UE 160, connection manager 105, and the $3^{rd}$ party entity 170 (via power management policy). When the UE 160 transmits the notification 314 it may include the relevant status information. If Radio Node 130 has additional information, or if there is extraneous information in Notification 314, Radio Node 130 could optionally modify add to or subtract from the received information before transmitting Notification 316. Upon receipt of a notification of the trigger event, connection manager 105 can checks the power management policy 320 (which may have been previously received from the $3^{rd}$ party entity 170), and determines a power management scheme 330 in accordance with the notification from the UE 160 and the power management policy. One skilled in the art will appreciate that the determining of a scheme may be performed by selecting a predefined scheme from a table. The selected scheme may be a set of power management parameters. The connection manager 105 then transmits a power management instruction 332 to radio node 130, and can optionally transmit notification 336 to the $3^{rd}$ party entity 170 to indicate that a power management instruction has been sent to UE 160. The notification to 3rd party entity 170 may include an indication of the selected power management scheme for the power management instruction. The notification may further include the device ID of UE 170 so that the $3^{rd}$ party entity 170 can keep track of the power management scheme implemented thereon, and send specific commands/queries to this device. Radio Node 130, upon receipt of the power management instruction 332 can forward instruction 334 to the UE (optionally amending the message if required).

Figure 4:
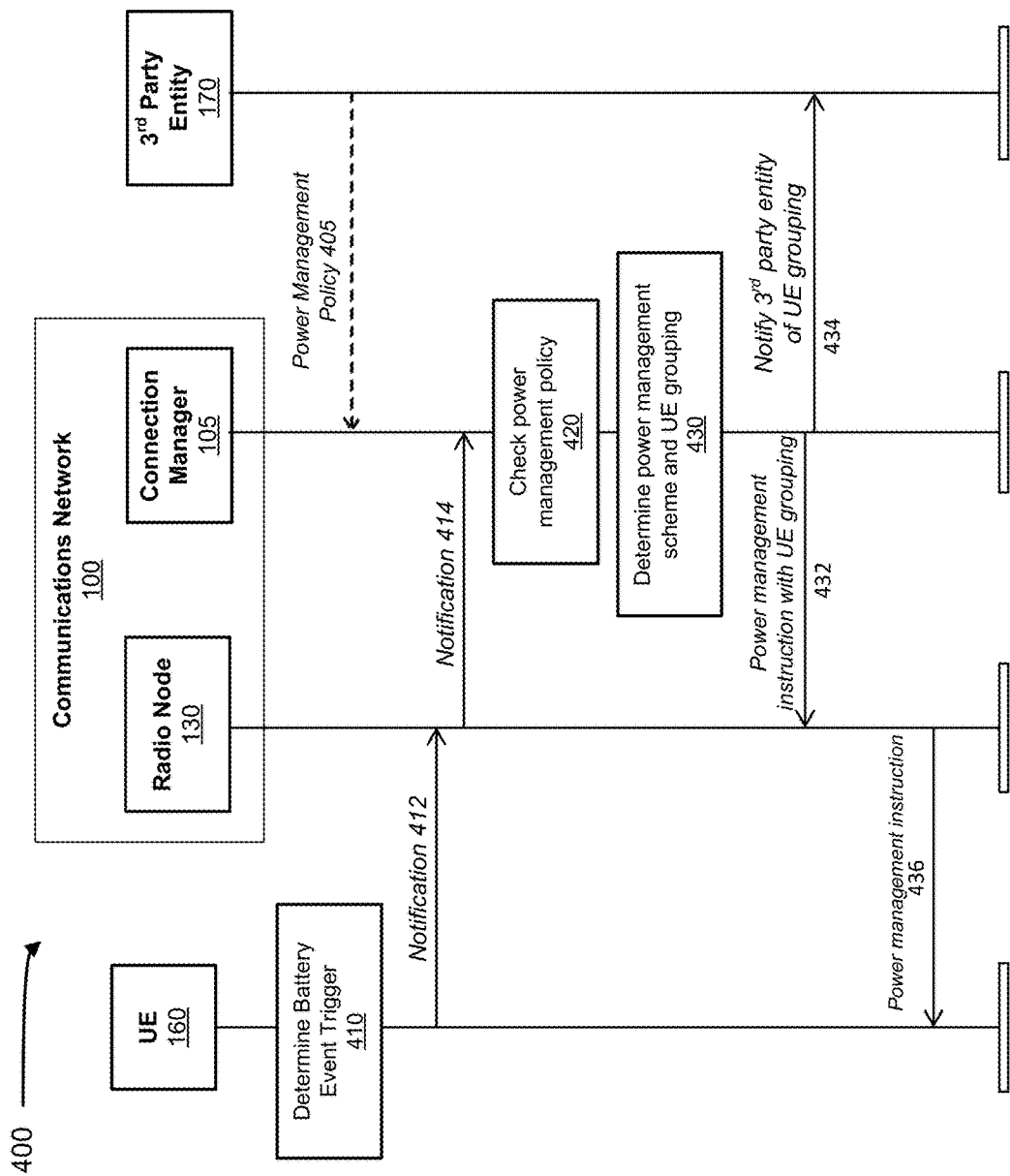
FIG. 4 is a call flow diagram illustrating a power management method for a UE through UE grouping, according to another embodiment of the present invention.

Referring to FIG. 4, there is shown a call flow diagram 400 illustrating a power management method performed within a communications network, according to another embodiment of the present invention. The call flow diagram 400 of FIG. 4 is similar to the call flow diagram 300 of FIG. 3. Steps 410 and 420 are similar to steps 310 and 320. After steps 405 and 410, UE 160 transmits a notification 412 to the Radio Node 130, which relays the Notification to CM 105 as Notification 414. The method begins to differ in step 430, where the connection manager 105 additionally determines a UE grouping for UE 160, and then transmits 432 a power management instruction with the UE grouping to radio node 130. This instruction indicates a UE grouping that the UE should be associated with. The radio node 130 then assigns the UE 160 to the indicated UE group, and transmits a power management instruction 436 to the UE group that UE 160 has been assigned to. This allows the radio node 130 to organize all UEs it manages into corresponding groups for performing power management in accordance with the same power management scheme. The connection manager 105 then notifies 434 the $3^{rd}$ party entity 170 of the UE grouping assigned to UE 160, and may also send a corresponding device ID. This allows the $3^{rd}$ party entity 170 to keep track of UE 160's grouping for sending specific commands/queries to this device Referring to FIGS. 5A-5C, there are shown power management schemes comprising various DRX cycles 510, 520, 530, according to embodiments of the present invention. As understood by those skilled in the art, the logic "high" output wakes up the device, so that a reading, measurement, or data may be retrieved or collected, for example. The logic "low" output places the device into a sleep mode so that the device may conserve battery power. In one embodiment, radio node 130 of FIG. 4 may serve different groups of UEs, with each group operating under a certain power management scheme. A first group may operate under the DRX cycle 510, a second group may operate under DRX cycle 520, and a third group may operate under DRX cycle 530, for example. In this way, radio node 130 may more efficiently manage large numbers of UEs with each being assigned to a specific UE group corresponding to a given power management scheme.

Figure 6:
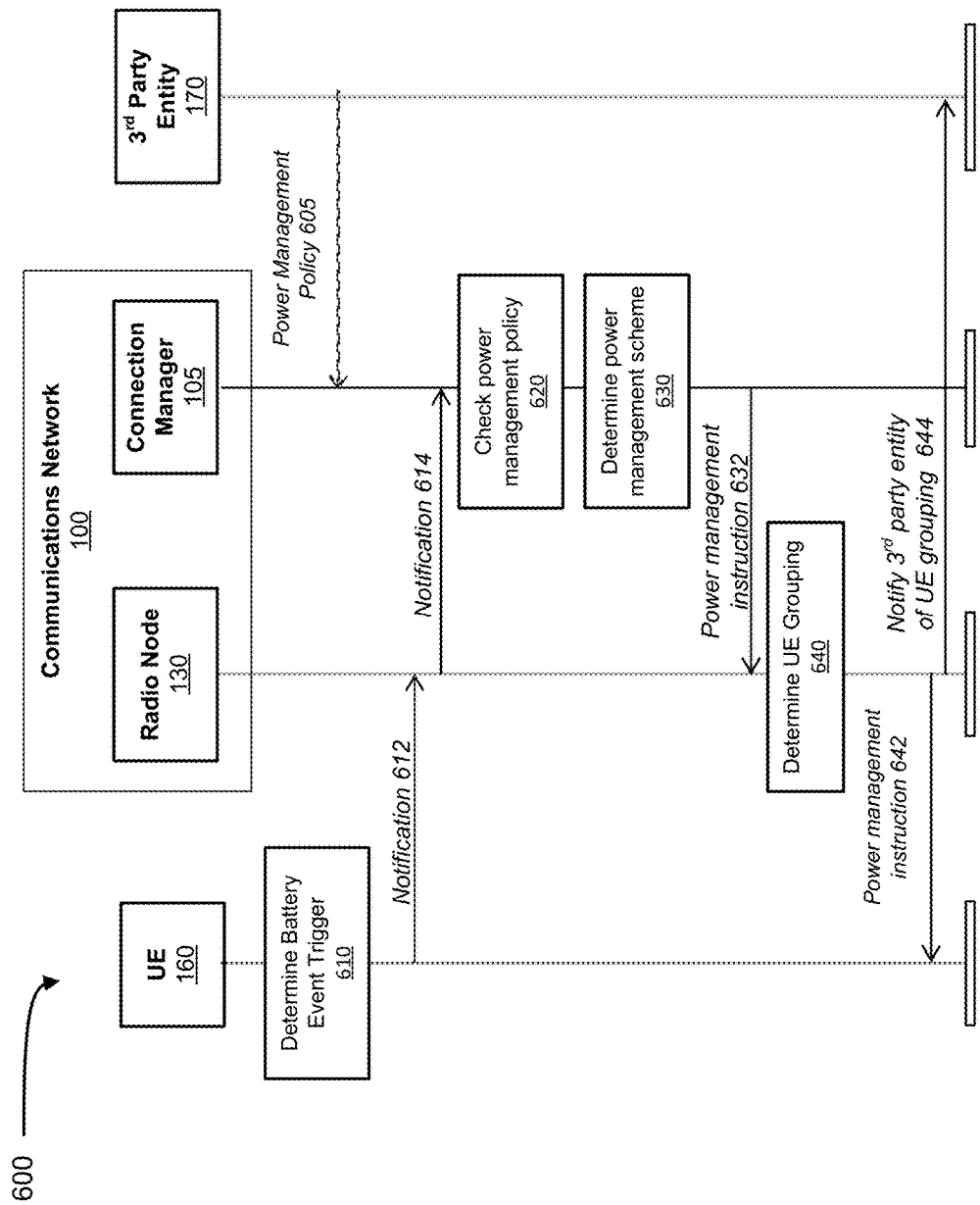
FIG. 6 is a call flow diagram illustrating a power management method for a UE through UE grouping determined at a radio node, according to another embodiment of the present invention.

Referring to FIG. 6, there is shown a call flow diagram 600 illustrating a power management method performed with communications network 100 to UE 160 of FIG. 1, according to another embodiment of the present invention. The timing diagram 600 of FIG. 6 begins with a power management policy being sent 605 to CM 105. A UE 160 determines a batter event trigger 610 and sends notification 612 to Radio node 130, which forwards the notification 614 to the CMS 105. Up to this point, the method is similar to timing diagram 400 of FIG. 4. The power management policy is checked 620, and at step 630, the connection manager 105 selects the power management scheme and transmits a corresponding power management instruction 632 to the radio node 130 without a UE grouping. The radio node 130 receives the power management instruction, and at step 640, determines a UE grouping for UE 160 based on the power management instruction. The radio node 130 then assigns the UE 160 to the appropriate UE grouping, transmits the appropriate power management instruction 642 to the UE 160, and notifies 644 the $3^{rd}$ party entity 170 of the UE grouping for tracking and correspondence purposes. The power management instruction 642 may be sent to all UEs in the group.

Figure 7:
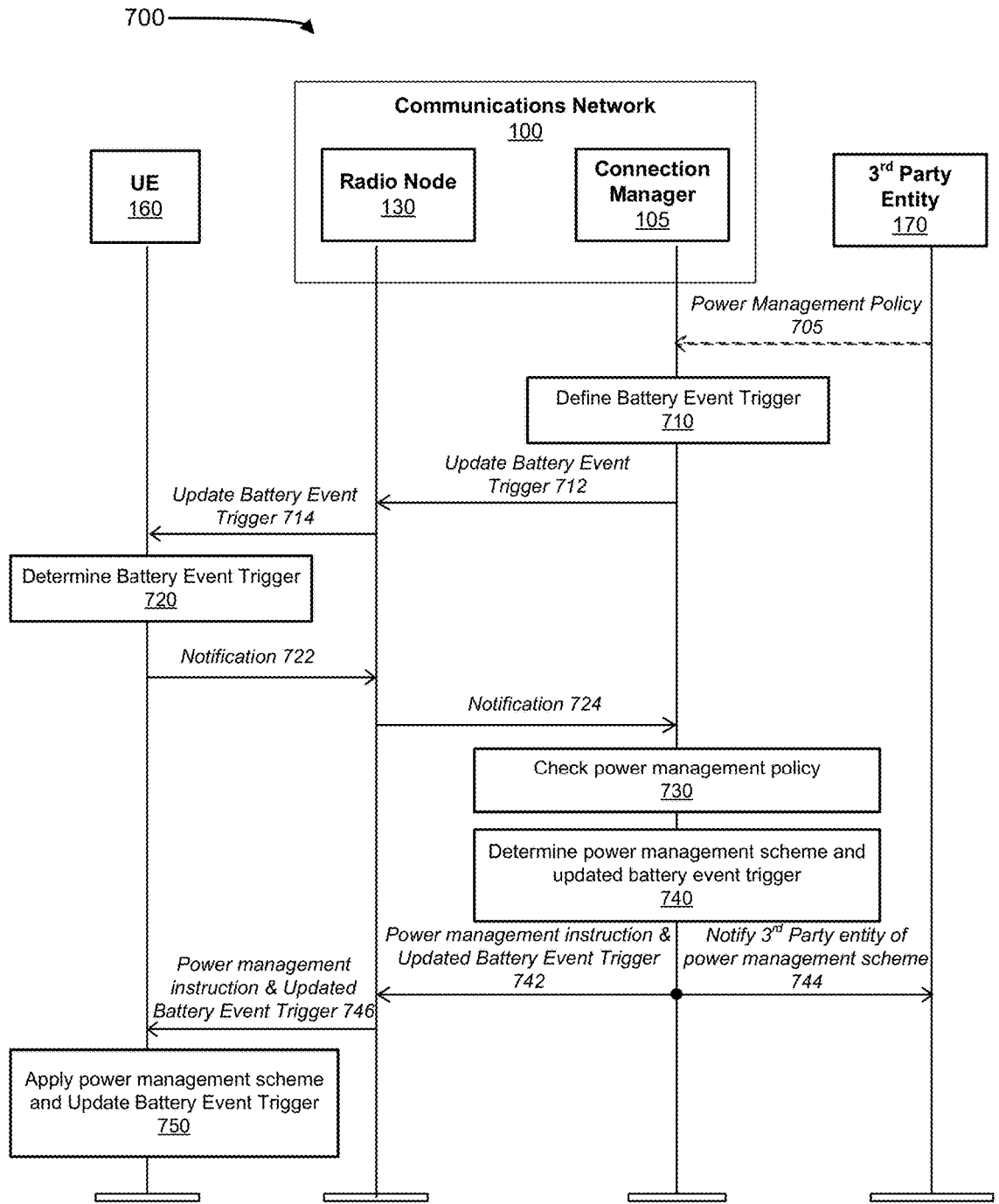
FIG. 7 is a call flow diagram illustrating a power management method for a UE which includes updating of a battery event trigger, according to an embodiment of the present invention.

Referring to FIG. 7, there is shown a call flow diagram 700 illustrating a power management method performed with communications network 100 to UE 160 of FIG. 1, according to another embodiment of the present invention. The call flow diagram 700 begins with a power management policy being provided 705 to CN 105. Based on the power management policy, a batter event trigger is defined in 710, and a battery event trigger update message is transmitted to the Radio node 130 in message 712, and is forwarded to the UE 160 in message 714. In step 720, the UE determines that the batter event has been triggered, and issues a notification 722 to the Radio Node 130, which sends notification 724 to CM 105. At step 730, CM 105 checks the power management policy and in step 740 determines the power management scheme and updates the trigger conditions. The power management instruction and updated trigger are sent towards the UE in 742, and the $3^{rd}$ party is notified in 744. The Radio Node 130 forwards the received instructions and triggers along to the UE in 746, and at step 750, the UE applies the updated scheme. Updating of the battery event trigger conditions may provide further power management flexibility in view of parasitic battery drain, reduced battery charge capacity over its lifespan, or changing battery event conditions or power management objectives.

Figure 8:
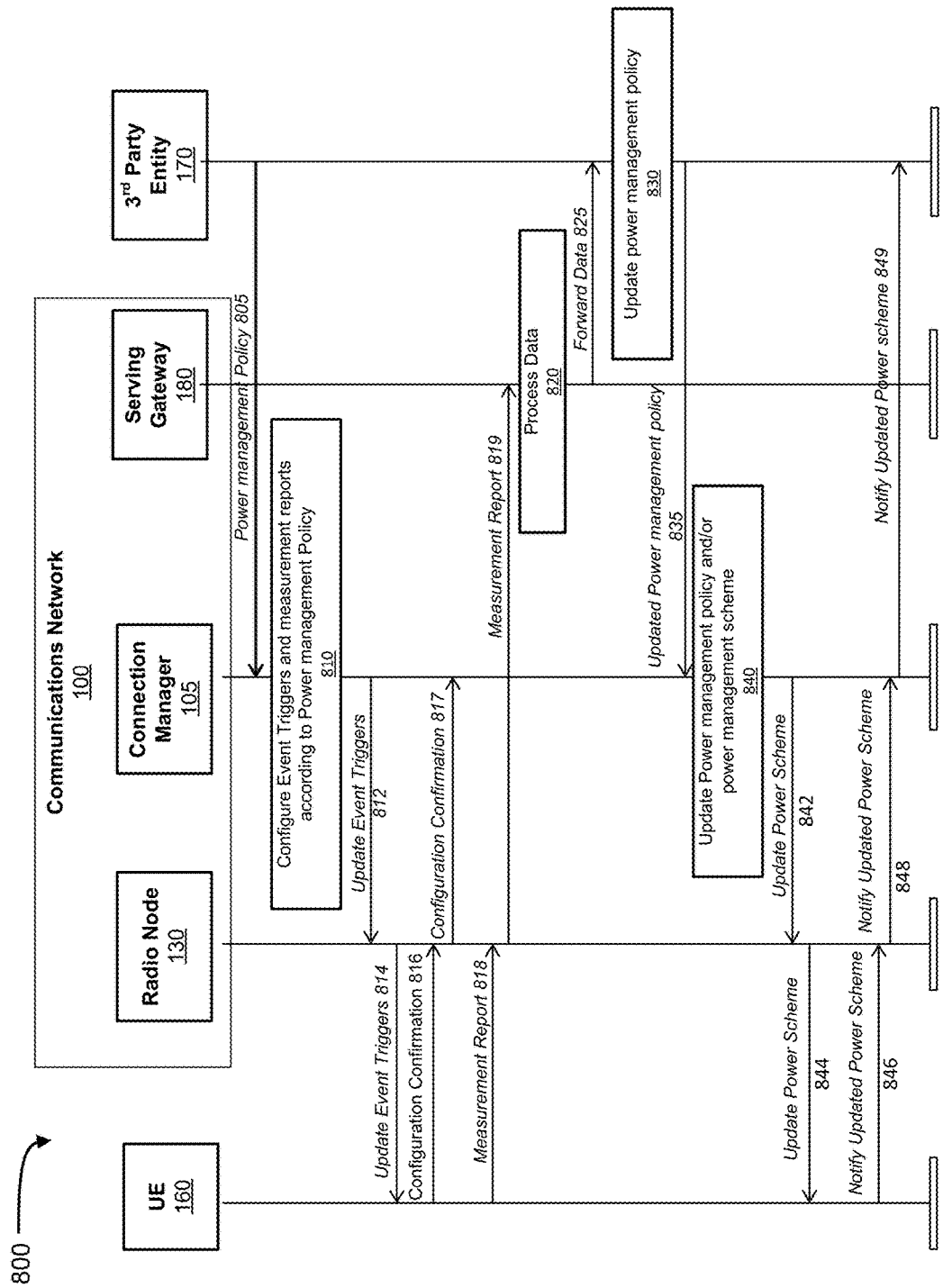
FIG. 8 is a call flow diagram illustrating a power management method for a UE which includes updating of a power management policy through a measurement report, according to an embodiment of the present invention.

Referring to FIG. 8, there is shown a call flow diagram 800 illustrating a power management method performed within communications network 100 of FIG. 1, according to another embodiment of the present invention. This embodiment further includes use of a serving gateway 180. In certain embodiments, the serving gateway 180 may comprise a functional entity or node within communications network 100. As will be explained shortly, the serving gateway 180 can be used to facilitate the transmission and processing of various data between the connection manager 105 and the $3^{rd}$ party entity 170.

As shown, the third party entity 170 sends a power management policy to the connection manager 105 of the communications network 100. The connection manager 105 then determines event triggers in accordance with the received power management policy. The updated event trigger parameters are then sent to UE 160 (via radio node 130). UE 160 updates the event trigger parameters, and replies to the connection manager 105 with a configuration confirmation. UE 160 can also provide a measurement report to the serving gateway 180. A measurement report may include the above described status information, but it may also include information about UE 160 and operating conditions. It may also include historical information, and information that was gathered between two different device reporting triggers. The serving gateway 180 at step 820 processes the measurement report, and forwards the processed data to the third party entity 170. The third party entity 170 then updates the power management policy based on the processed data derived from the measurement report, and sends the updated power management policy to the connection manager 105. The connection manager 105 may then transmit an updated the power management scheme to UE 160 based on the new power management policy provided by the third party entity 170. This updated power management scheme may then be transmitted to UE 160 at the next transmission, or pending an event trigger. UE 160 may then notify connection manger 105 and $3^{rd}$ party entity 170 of its updated power management scheme.

Figure 9A:
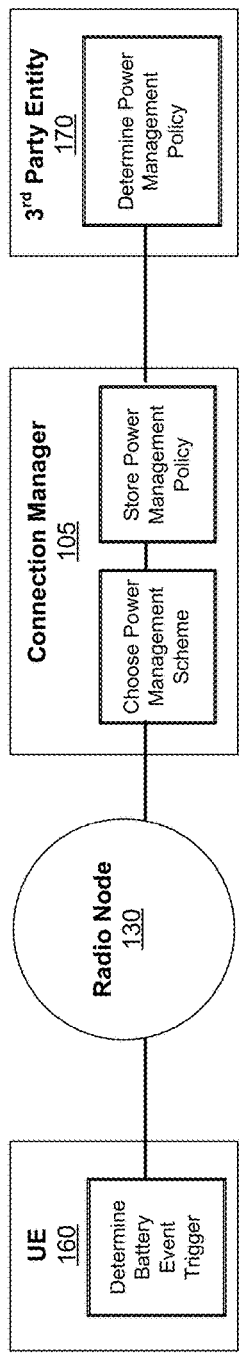
FIGS. 9A-9C illustrate functional relationships between entities within the communication network and a third party entity, according to embodiments of the present invention.
Figure 9B:
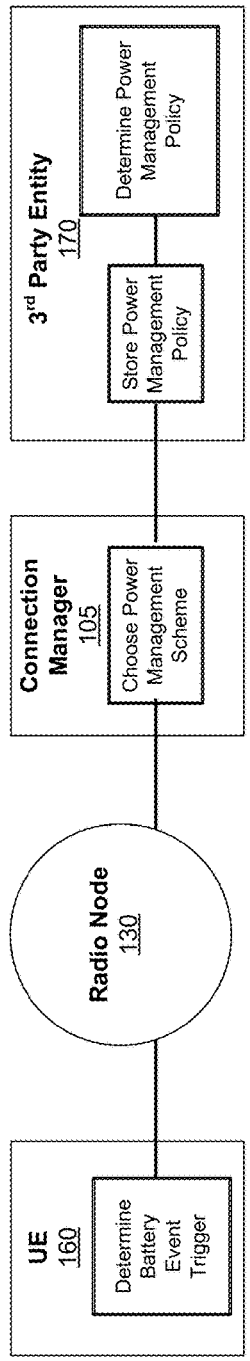
Figure 9C:
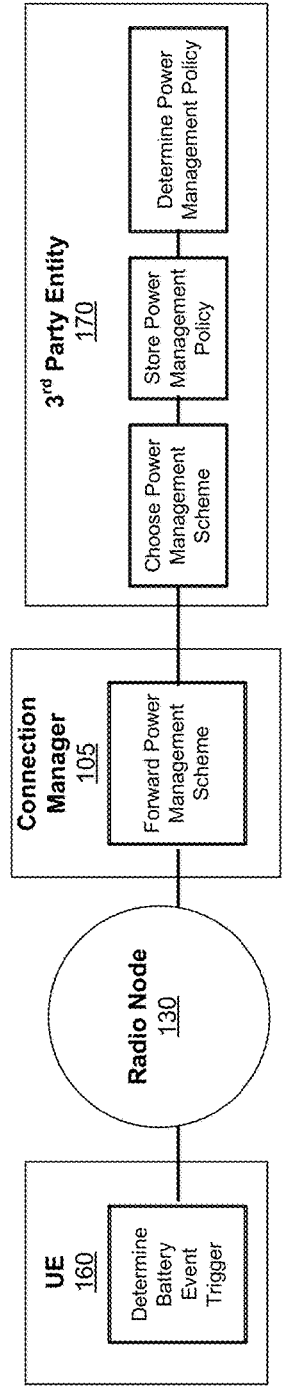

Referring to FIGS. 9A-9C, there are shown various functional relationships between entities within the communications network 100, UE 160 and third party entity 170 shown in FIG. 1. FIGS. 9A-9C show the different roles performed by each entity and the connectivity between the nodes. In FIG. 9A for example, $3^{rd}$ party entity 170 determines the power management policy, while UE 160 determines a battery trigger event, and the connection manager 105 stores and determines the power management scheme. FIG. 9B differs from FIG. 9A in that the $3^{rd}$ party entity 170 stores the power management policy locally, and the connection manager 105 instead refers to the power management policy stored at the $3^{rd}$ party entity 170 to choose the power management scheme. FIG. 9C differs from FIG. 9B in that the $3^{rd}$ party entity 170 further chooses the power management scheme based on the power management policy, and that the connection manager 105 instead forwards the chosen power management scheme to UE 160 (via Radio node 130). In other embodiments (not shown), the aforementioned functions may be alternatively allocated between each of the UE 160, Radio node 130, connection manager 105, and $3^{rd}$ party entity 170.

Figure 10:
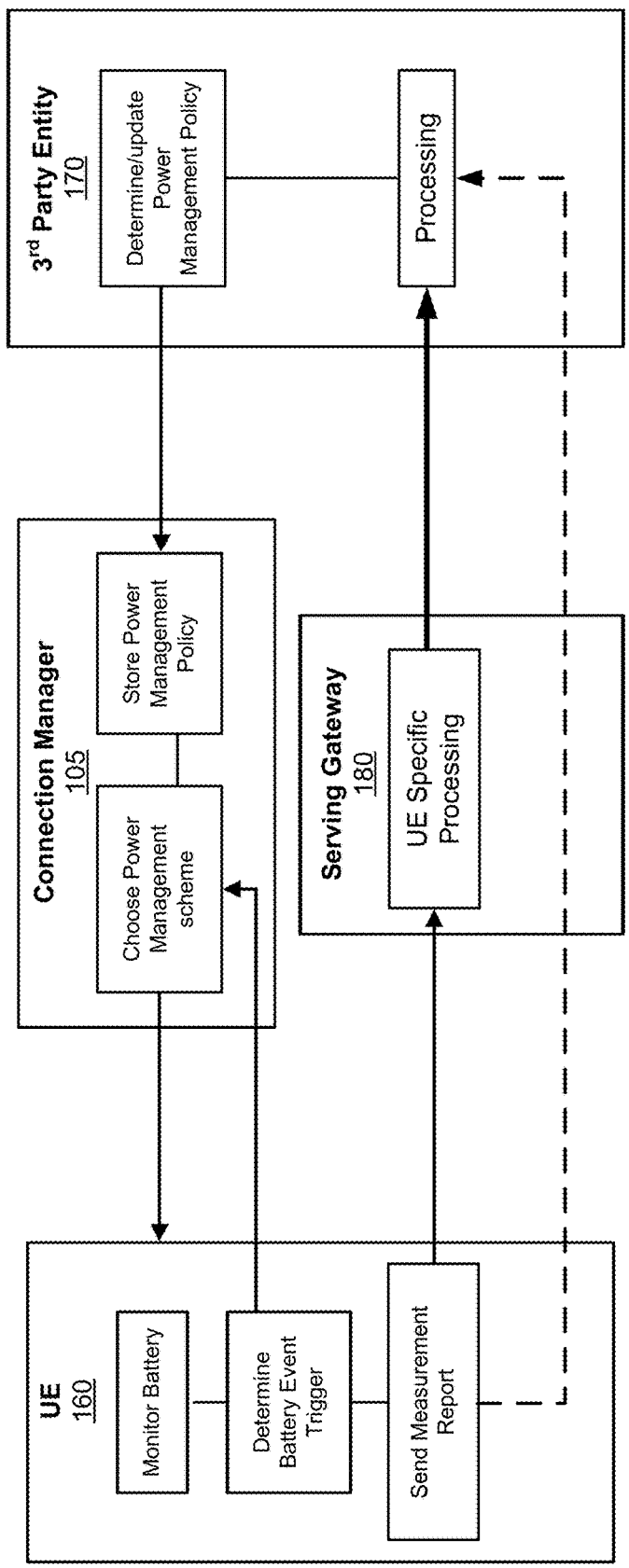
FIG. 10 is a illustrates connectivity between entities within the communication network and a third party entity, according to yet another embodiment of the present invention.

Referring to FIG. 10, there is shown a block diagram illustrating the connectivity between UE 160, connection manager 105, serving gateway 180, and $3^{rd}$ party entity 170 shown in FIG. 8, along with the responsibilities of each of the entities. As shown, UE 160 is configured to monitor its battery, send a battery event trigger to connection manager 105 when a battery event is reached, and send a measurement report to serving gateway 180. Connection manager 105 receives and stores a power management policy from $3^{rd}$ party entity, and chooses a power management scheme based on the battery event trigger and stored power management policy. The serving gateway 180 performs UE specific processing on the measurement report, and transmits the processed data to the $3^{rd}$ party entity. The $3^{rd}$ party entity 170 uses the processed data to update the power management policy accordingly, which it may then send to connection manager 105. In this way, the power management policy may be updated in view of various battery event triggers or measurement reports. In other embodiments (not shown), the aforementioned functions may be alternatively allocated between each of the UE 160, Radio node 130, connection manager 105, serving gateway 180, and $3^{rd}$ party entity 170

Figure 11:
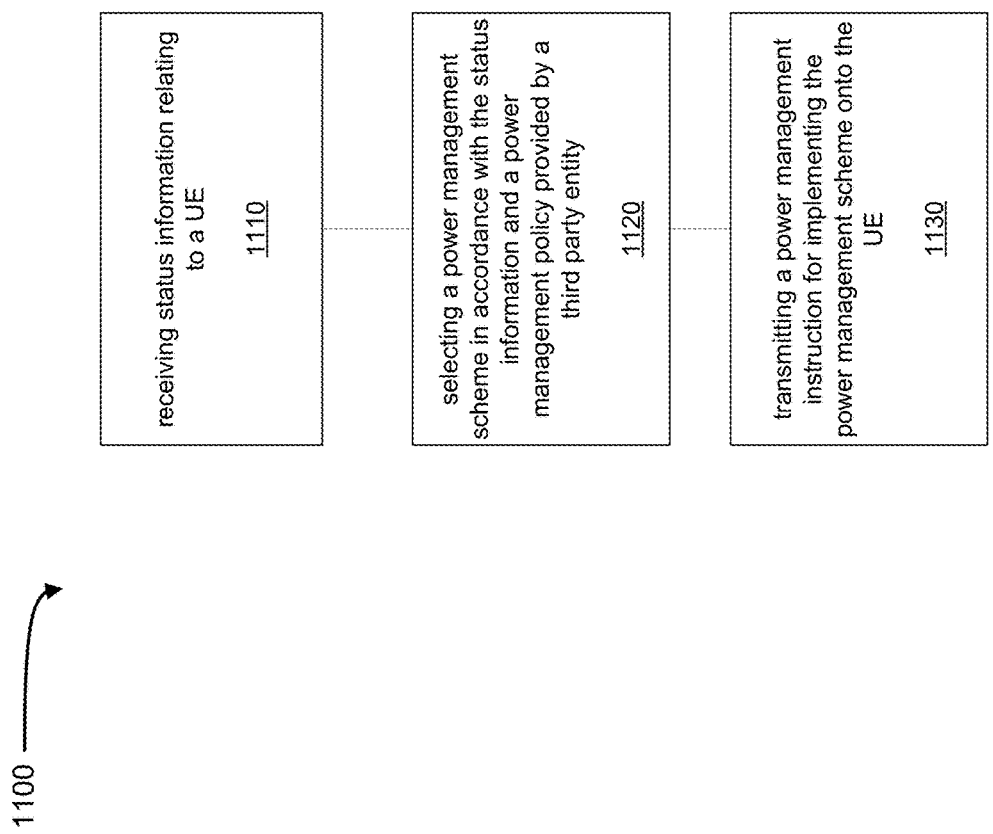
FIG. 11 is a flow chart illustrating a power management method for a UE communicatively coupled to a communications network, according to another embodiment of the present invention.

Referring to FIG. 11, there is shown a flow chart illustrating a power management method 1100 for a third party entity to implement a power management scheme on a UE, according to an embodiment of the present invention. The method 1100 may be applied by the $3^{rd}$ party entity 170 in FIG. 1, and may correspond to the functional schematic of FIG. 9C, for example. At step 1110, status information associated with the UE is received. This information may be received through the serving gateway of the network 100, and may have been processed by nodes in the network after the UE has reported its battery levels. At step 1120, a power management scheme is selected in accordance with the status information and a power management policy provided by a $3^{rd}$ party entity. Finally, at step 1130, a power management instruction is transmitted towards the UE.

Figure 12:
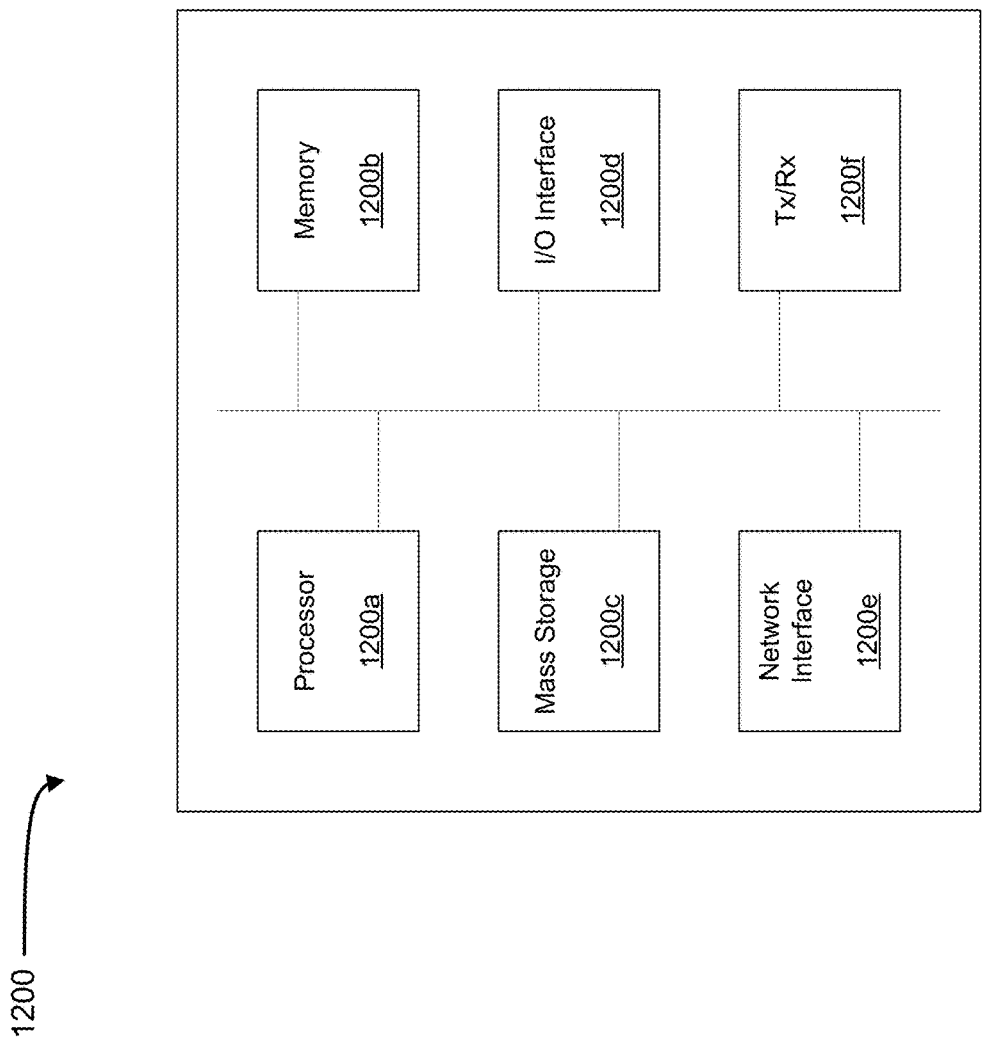
FIG. 12 is a schematic diagram of a hardware device, according to an embodiment of the present invention.

Referring to FIG. 12, there is shown a schematic diagram of a controller 1200 that may for example, perform any or all of steps of method 200 in FIG. 2, or method 1100 of FIG. 11, according to different embodiments of the present invention. In certain embodiments, the controller 1200 may comprise any of UE 160, Radio node 130, connection manager 105, or third party entity 170, and perform any one of their corresponding functional steps.

As shown in FIG. 12, the controller 1200 includes a processor 1200a, memory 1200b, non-transitory mass storage 1200c, I/O interface 1200d, network interface 1200e, and a transceiver 1200f, all of which are communicatively coupled via bi-directional bus. According to certain embodiments, any or all of the depicted elements may be utilized, or only a subset of the elements. Further, the controller 1200 may contain multiple instances of certain elements, such as multiple processors, memories, or transceivers. Also, elements of the hardware device may be directly coupled to other elements without the bi-directional bus.

The memory 1200b may include any type of non-transitory memory such as static random access memory (SRAM), dynamic random access memory (DRAM), synchronous DRAM (SDRAM), read-only memory (ROM), any combination of such, or the like. The mass storage element 1200c may include any type of non-transitory storage device, such as a solid state drive, hard disk drive, a magnetic disk drive, an optical disk drive, USB drive, or any computer program product configured to store data and machine executable program code. According to certain embodiments, the memory 1200b or mass storage 1200c may have recorded thereon statements and instructions executable by the processor 1200a for performing any of the aforementioned method steps described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Embodiments of the present invention disclose various systems and methods for performing power management of a UE device through a 3$^{rd}$ party power management policy, via a communications network serving the UE device. By allowing the 3$^{rd}$ party entity to define a policy to control power management of the UE device, the communications network may more flexibly adapt to changing circumstances within the UE device or network, and may better focus its processing resources towards other endeavors such as mobility and connectivity management functions. In this way, operational efficiency of the communications network may be improved.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:
1. A method of transmitting User Equipment (UE) power management instructions, the method comprising:
receiving, at the connection manager, from a third party entity outside the mobile network and functionally separate from a network domain associated with the connection manager, a power management policy for setting a power management scheme according to status information provided by the UE;
receiving, at the connection manager from a radio node of the mobile network, the status information from the UE; and
transmitting, from the connection manager to the radio node, a power management instruction determined in accordance with the received policy and the received status information, wherein the power management instruction instructs the UE to modify at least one power management parameter of the UE to carry out the power management scheme and comprises a UE grouping message indicating a UE group, the UE grouping message to be used by the radio node for assigning the UE to the UE group and transmitting the power management instruction to the UE group.

2. The power management method of claim 1 wherein the third party entity comprises an application server physically separate from infrastructure of the mobile network, and outside a core network of the mobile network.

3. The power management method of claim 1 wherein the third party entity comprises at least one function residing on a network slice operating on the infrastructure of the mobile network, wherein the at least one function is functionally separated through traffic isolation from the core network of the mobile network.

4. The power management method of claim 1 wherein the status information is selected from a list consisting of: a battery value, a data measurement, or data traffic information.

5. The method of claim 1 wherein the at least one power management parameter is selected from a list consisting of a discontinuous reception (DRX) power saving cycle, an idle mode power saving scheme, or an inactivity timer.

6. The method of claim 1 wherein the power management policy comprises a threshold, and the power management instruction is transmitted when the status information satisfies the threshold.

7. The method of claim 1 wherein the power management policy comprises a lookup table, and the at least one power management parameter is determined in accordance with the lookup table.

8. The method of claim 1 wherein the power management instruction comprises the at least one power management parameter.

9. The method of claim 1 wherein the method further comprises: receiving the power management instruction with a radio node serving the UE; assigning the UE to the UE group corresponding to the at least one power management parameter; and maintaining the UE group in accordance with the at least one power management parameter.

10. The method of claim 1 further comprising notifying the third party entity of the UE group to which the UE was assigned.

11. The method of claim 1 further comprising notifying the third party entity of transmission of the power management instruction.

12. The method of claim 1 further comprising sending a status information request to the UE to prompt transmission of the status information from the UE.

13. The method of claim 1 further comprising:
receiving, from the third party entity, an updated power management policy based on a measurement report provided by the UE.

14. The method of claim 1 wherein the UE comprises a machine type communication (MTC) device.

15. A connection manager deployed on infrastructure of a mobile network for controlling user equipment (UE) power management, the connection manager comprising:
a network interface;
a processor; and
a non-transient memory for storing instructions that when executed by the processor, cause the connection manager to be operative to:
receive, from a third party entity functionally separate from the UE and outside the mobile network management and functionally separate from a network domain associated with the connection manager, a power management policy for setting a power management scheme according to status information provided by the UE; and
transmit, to a radio node of the mobile network, a power management instruction over the network interface and towards the UE indicative of at least one power management parameters of the UE, wherein the power management instruction instructs the UE to modify at least one power management parameter of the UE to carry out the power management scheme and comprises a UE grouping message indicating a UE group, the UE grouping message to be used by the radio node for assigning the UE to the UE group and transmitting the power management instruction to the UE group.

16. A method performed by a radio node of a mobile network, the method comprising:
receiving, from a connection manager deployed on infrastructure of the mobile network, at least one trigger condition indicating conditions for a trigger event to trigger a user equipment (UE) to transmit status information;
transmitting, to the UE, the at least one trigger condition;
receiving, from the UE, the status information to be used in selection of an appropriate UE power saving scheme;
transmitting, to the connection manager, the status information;
receiving, from the connection manager, a power management instruction indicative of at least one power management parameter of the UE; and,
transmitting, to the UE, the power management instruction.

17. The method of claim 16, further comprising:
receiving, from the UE a measurement report, the measurement report including at least one of: the status information, UE operating conditions, and historical information; and,
transmitting, to a serving gateway, the measurement report for delivery to a third party entity functionally separate from the UE and functionally distinct from the mobile network management.

* * * * *

UNITED STATES PATENT AND TRADEMARK OFFICE
CERTIFICATE OF CORRECTION

PATENT NO. : 10,165,514 B2
APPLICATION NO. : 15/169355
DATED : December 25, 2018
INVENTOR(S) : Sophie Vrzic, Hang Zhang and Nimal Gamini Senarath It is certified that error appears in the above-identified patent and that said Letters Patent is hereby corrected as shown below:

On the Title Page

Below Abstract, "17 Claims, 12 Drawing Sheets" should read --19 Claims, 12 Drawing Sheets--

In the Claims

Column 12 Line 68 Claims 18 and 19 are missing and should read:

--18. A radio node apparatus of a mobile network, the radio node apparatus comprising:
a network interface;
a transceiver;
a processor; and
a non-transient memory for storing instructions that when executed by the processor, cause the radio node apparatus to be operative to:
receive, from a connection manager deployed on infrastructure of the mobile network, at least one trigger condition indicating conditions for a trigger event to trigger a user equipment (UE) to transmit status information;
transmit, to the UE, the at least one trigger condition;
receive, from the UE, the status information to be used in selection of an appropriate UE power saving scheme;
transmit, to the connection manager, the status information;
receive, from the connection manager, a power management instruction indicative of at least one power management parameter of the UE; and,
transmit, to the UE, the power management instruction.--

--19. The radio node apparatus of claim 18, wherein the instructions when executed by the processor, further cause the radio node apparatus to be operative to:
receive, from the UE a measurement report, the measurement report including at least one of: the status information, UE operating conditions, and historical information; and Signed and Sealed this
Fourteenth Day of May, 2019

Andrei Iancu
*Director of the United States Patent and Trademark Office*

CERTIFICATE OF CORRECTION (continued)
U.S. Pat. No. 10,165,514 B2 transmit, to a serving gateway, the measurement report for delivery to a third party entity functionally separate from the UE and functionally distinct from the mobile network management.--